US009382348B2

(12) United States Patent
Kufeld et al.

(10) Patent No.: US 9,382,348 B2
(45) Date of Patent: Jul. 5, 2016

(54) SYSTEM AND METHOD FOR POLYMERIZATION

(71) Applicant: Chevron Phillips Chemical Company LP, The Woodlands, TX (US)

(72) Inventors: Scott E. Kufeld, Houston, TX (US); Joel A. Mutchler, Kingwood, TX (US); David S. Boone, Webster, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 245 days.

(21) Appl. No.: 14/079,434

(22) Filed: Nov. 13, 2013

(65) Prior Publication Data

US 2015/0133620 A1 May 14, 2015

(51) Int. Cl.

| | |
|---|---|
| ***C08F 6/24*** | (2006.01) |
| ***C08F 2/12*** | (2006.01) |
| ***B01J 19/00*** | (2006.01) |
| ***C08F 10/00*** | (2006.01) |
| *C08F 110/02* | (2006.01) |
| *C08F 210/16* | (2006.01) |

(52) U.S. Cl.

CPC ........ *C08F 10/00* (2013.01); *B01J 2208/00761* (2013.01); *B01J 2208/00787* (2013.01); *C08F 110/02* (2013.01); *C08F 210/16* (2013.01)

(58) Field of Classification Search

CPC .......... C08F 2/12; C08F 6/24; B01J 19/0033; B01J 2119/00123; B01J 2219/00164; B01J 2219/00184

USPC .......................................... 528/500; 422/105

See application file for complete search history.

(56) References Cited

U.S. PATENT DOCUMENTS 3,197,454 A 7/1965 Plaster
4,211,863 A 7/1980 McDaniel et al.
4,332,933 A * 6/1982 Di Drusco ................ C08F 6/02 422/139
5,432,242 A 7/1995 Baron
5,880,230 A 3/1999 Syrinek et al.
6,967,230 B2 11/2005 Hottovy et al.
7,446,167 B2 11/2008 Blackmon et al.
8,049,052 B2 11/2011 Kreischer et al.
8,344,099 B2 * 1/2013 Ballarini ................ C08F 6/005 528/500
8,440,772 B2 5/2013 Yang et al.

OTHER PUBLICATIONS

Product Brochure: Azbil AX Series Vortex Meters, 12 pages (Undated).*

The Aluminum Alkyls Consortium, Categorization of Aluminum Alkyls, Prepared by Health & Environmental Horizons, Ltd., Mar. 20, 2001, pp. 1-15, Revised Aug. 23, 2001.

Witt M. et al., Organoaluminum Chemistry at the Forefront of Research and Development, Current Science, Feb. 25, 2000, pp. 410-430, vol. 78, No. 4.

Stauffer Chemical Company, Aluminum Alkyls, 1976, pp. 1-2, Specialty Chemical Division Westport, Connecticut 06880.

* cited by examiner

*Primary Examiner* — Fred M Teskin

(74) *Attorney, Agent, or Firm* — Fletcher Yoder, P.C.

(57) ABSTRACT

Techniques are provided for polymerization. A polymerization method may include polymerizing a monomer in a polymerization reactor to produce a slurry comprising polyolefin particles and a diluent, flowing the slurry out of the polymerization reactor through an outlet of the polymerization reactor, receiving the slurry from the outlet into a slurry handling system, conveying a first mixture from the slurry handling system to a diluent and monomer recovery system, and injecting steam into the first mixture downstream of the slurry handling system using a steam injection system.

31 Claims, 4 Drawing Sheets

CATALYST
ALKYL
CONTROLLER
STEAM

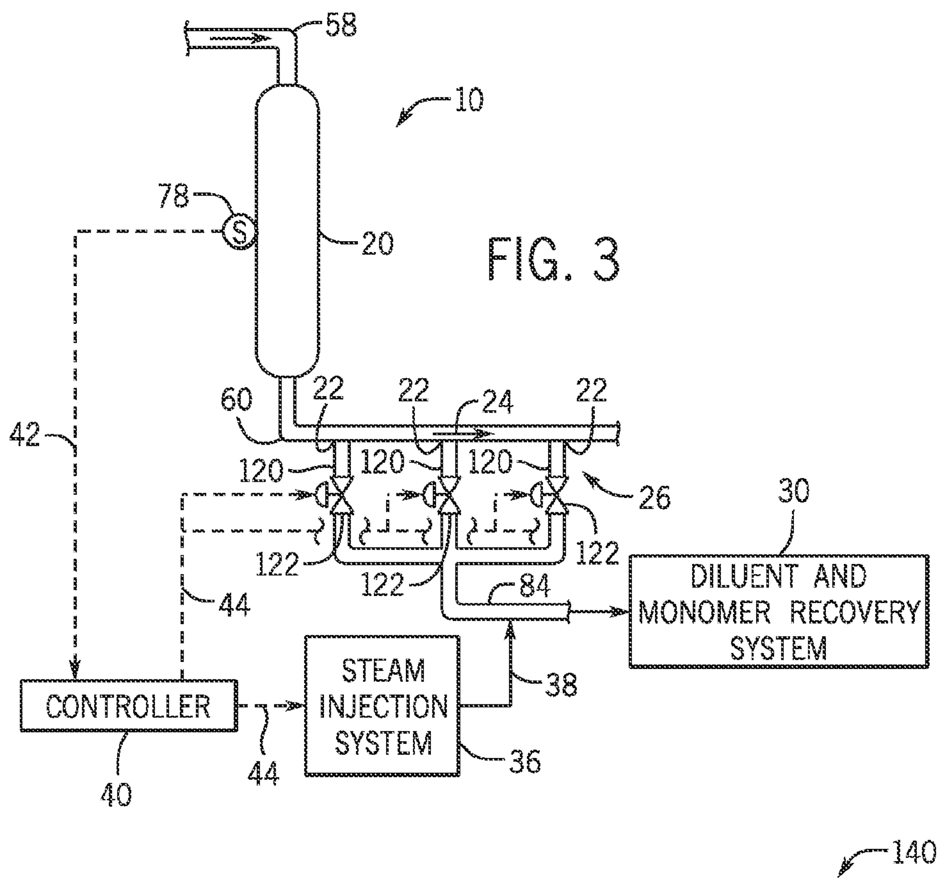
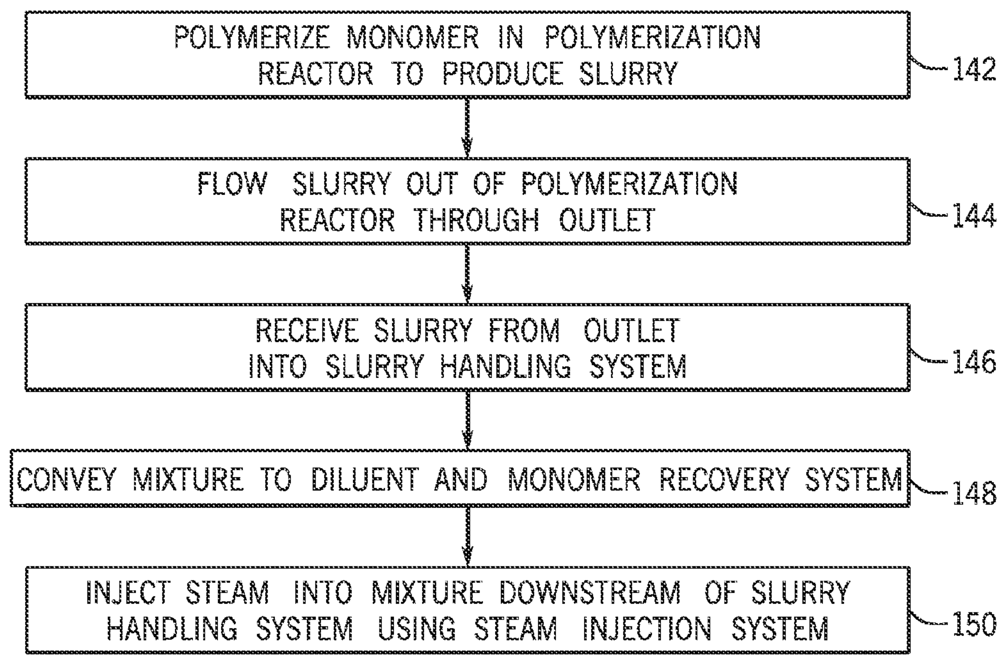
FIG. 4

SYSTEM AND METHOD FOR POLYMERIZATION

BACKGROUND

The present disclosure relates generally to polymerization systems, and more particularly, to polymerization systems that include a steam injection system.

This section is intended to introduce the reader to aspects of art that may be related to aspects of the present disclosure, which are described below, claimed below, or both. This discussion is believed to be helpful in providing the reader with background information to facilitate a better understanding of the various aspects of the present disclosure. Accordingly, it should be understood that these statements are to be read in this light and not as admissions of prior art.

Polyolefins, such as polyethylene and polypropylene, may be prepared by particle form polymerization, also referred to as slurry polymerization, in a polymerization system. In this technique, feed materials, such as monomer, catalyst, cocatalyst, comonomer, and diluent, are fed to a loop reactor to establish a slurry. In the loop reactor, the slurry is circulated while polymerization occurs, forming product slurry. The product slurry, which contains solid polyolefin particles in a liquid medium, is then taken off or withdrawn from the reactor.

The product slurry may then be sent to a recovery system to separate the solid polyolefin particles from the other components of the product slurry. However, before the product slurry reaches the recovery system, one or more deactivation materials may be injected into the product slurry to deactivate certain components of the product slurry, such as the catalyst, a co-catalyst, other additives, or any combination thereof. Such deactivation may help prevent undesired polymerization from occurring downstream of the loop reactor, which otherwise may cause operational issues within the recovery system. It is now recognized that undesirable issues may be associated with the injection of certain deactivation materials. For example, it is now recognized that injection of certain deactivation materials at high flow rates may lead to operational issues in the recovery system. In addition, it is now recognized that the injection of high flow rates of certain deactivation materials may reduce the overall efficiency of the polymerization system, increase costs associated with the operation of the polymerization system, or both.

BRIEF DESCRIPTION OF THE DRAWINGS

Advantages of the present disclosure may become apparent upon reading the following detailed description and upon reference to the drawings in which:

FIG. 3 is a schematic flow diagram of an embodiment of a steam injection system for use with a plurality of settling legs of the polyolefin manufacturing system of FIG. 1, in accordance with present embodiments;

FIG. 4 is a flow chart depicting a method for operating the steam injection system with the polyolefin manufacturing system of FIG. 1, in accordance with present embodiments;

DETAILED DESCRIPTION OF SPECIFIC EMBODIMENTS

Figure 1:
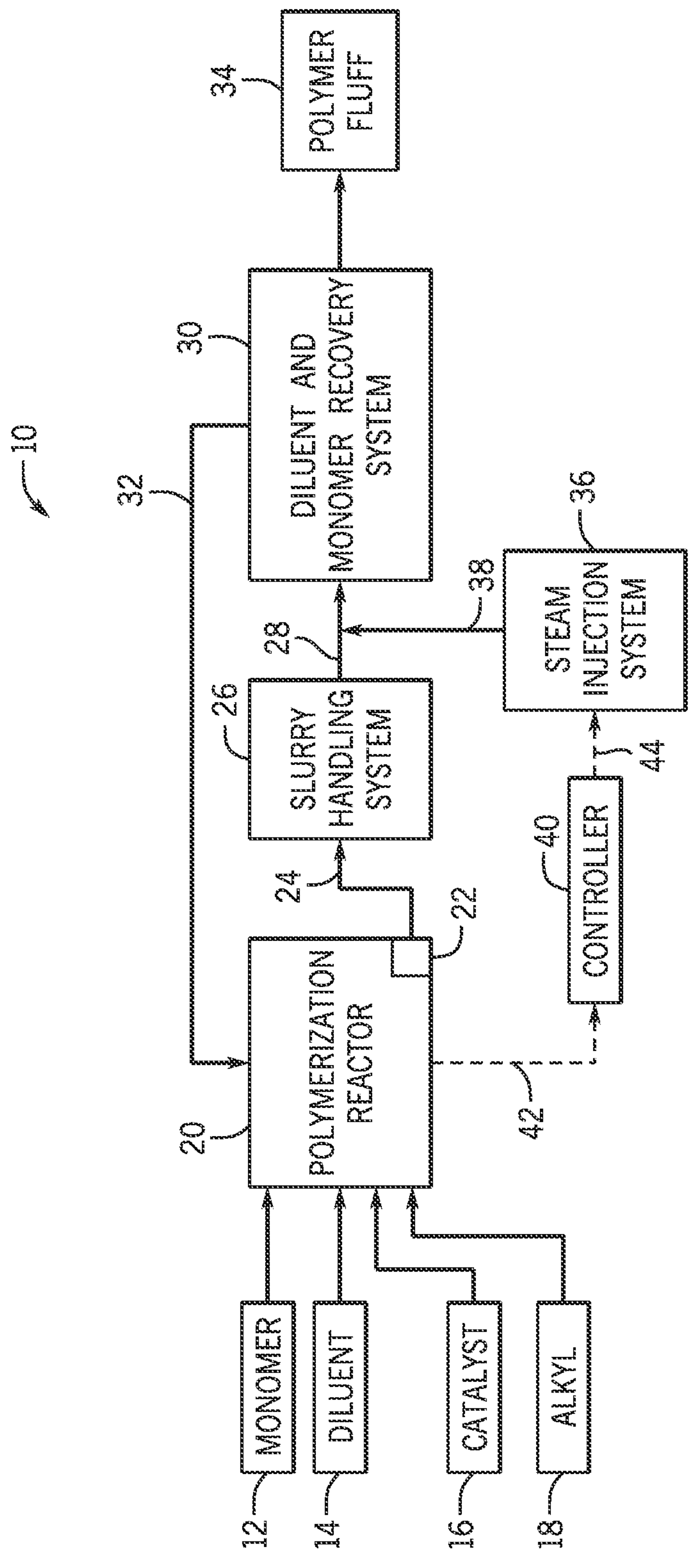
FIG. 1 is block diagram of an embodiments of a polyolefin manufacturing system with a steam injection system in accordance with present embodiments.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for polyolefin manufacturing. More specifically, the present disclosure is directed to techniques for injecting steam into a slurry produced by a polyolefin manufacturing system. For example, the polyolefin manufacturing system may react a monomer, a catalyst, a co-catalyst, other additives, or any combination thereof, to produce polymers in a reactor system of the polyolefin manufacturing system. The catalyst may increase the rate of polymerization of the monomer such that a larger amount of polymers may be produced compared to a reaction without the catalyst. A slurry handling system may receive the slurry from the reactor system and convey a mixture (e.g., a mixture of polymers and a liquid phase, a vapor phase, or both) to a diluent and monomer recovery system, in which polymers produced in the reactor system may be separated from the diluent and unreacted monomer. The steam may be injected into the mixture to deactivate the catalyst, a co-catalyst, other additives, or any combination thereof, present in the mixture before the mixture reaches the diluent and monomer recovery system, thereby reducing or preventing further polymerization from occurring downstream of the reactor system. The polymers from the diluent and monomer recovery system may then be extruded and pelletized to produce polymer pellets in an extrusion/loadout system of the polyolefin manufacturing system before being distributed to customers.

It is now recognized that the injection of traditional deactivation materials into the mixture may pose several challenges to the cost-effective and efficient operation of the polyolefin manufacturing system. For example, the amount of the catalyst, co-catalyst, additives, or any combination thereof, to be deactivated may vary during operation of the polyolefin manufacturing system. In spite of these variations, traditional polyolefin manufacturing systems may inject the deactivation material at a constant flow rate sufficient to deactivate the catalyst, co-catalyst, additives, or any combination thereof, across an entire manufacturing range of the polyolefin manufacturing system. In other words, a large flow rate of the deactivation material may be selected for injection such that deactivation may be achieved for the highest expected amounts of catalyst, co-catalyst, additives, or any combination thereof, in the slurry. Unfortunately, operational issues in the diluent and monomer recovery system may occur when the deactivation material is injected at such high flow rates. For example, the excess deactivation material not used to deactivate the catalyst, co-catalyst, additives, or any combination thereof, may accumulate in certain portions of the diluent and monomer recovery system, such as condensers, coolers, or other equipment, thereby causing lost production and higher maintenance costs related to freezing of the deactivation material in the equipment. Thus, injecting large amounts of excess deactivation material may increase the operational costs, material costs, or both that are associated with the polyolefin manufacturing system.

By using the disclosed techniques to inject steam into the mixture, the reliability associated of the polyolefin manufacturing system may be increased. For example, the disclosed techniques may enable the amount of excess steam to be reduced, thereby reducing or preventing the operational issues associated with the accumulation of traditional deactivation materials in the diluent and monomer recovery system. In addition, the operational costs, material costs, or both associated with injecting the steam may be reduced by using the disclosed techniques. Specifically, the disclosed techniques may enable the amount of the steam injected into the mixture to be varied when the amount of the catalyst, co-catalyst, additive, or any combination thereof, in the mixture varies.

As described in detail below, the disclosed techniques include a steam injection system to inject steam into the mixture downstream of the slurry handling system. Steam may act as the deactivation material to deactivate the catalyst, co-catalyst, additives, or any combination thereof, present in the mixture. In addition, the temperature of the injected steam may be greater than that of the mixture, thereby heating the mixture, which may improve the deactivation of certain catalysts, co-catalysts, additives, or any combination thereof. Some of the disclosed techniques may include a control system that includes one or more automation controllers to control the steam injection system such that the catalyst, co-catalyst, additives, or any combination thereof, present in the mixture are sufficiently deactivated prior to reaching the diluent and monomer recovery system. In the following discussion, the term "automation controller" may refer to various control systems and controllers, such as distributed control systems, programmable logic controllers, and the like.

In certain embodiments, the control system associated with the steam injection system may receive an input indicative of a polymerization characteristic. The polymerization characteristic may represent one or more of various parameters, properties, calculated values, or any combination thereof, associated with the polyolefin manufacturing system, such as, but not limited to, the amount of the catalyst, co-catalyst, additive, or any combination thereof, present in the slurry. The control system may activate an output to actuate or adjust the steam injection system to inject the steam into the mixture downstream of the slurry handling system at a desired flow rate, pressure, or both, based at least in part on the input indicative of the polymerization characteristic. In other words, the input may be used in the feedback control of the steam injection system by the control system. Thus, use of embodiments of the disclosed control system to control operation of the steam injection system may help increase the efficiency, increase production, decrease expenses, or any combination thereof, of the polyolefin manufacturing system. For example, by reducing the amount of the steam used as the deactivation material, operational, fixed, and variable costs associated with the steam may be reduced. In addition, reducing the amount of the steam injected into the mixture may help prevent or reduce operation issues associated with the accumulation of water in the diluent and monomer recovery system. Further, use of the steam as the deactivation material may reduce the capital costs associated with the use of traditional deactivation materials, such as liquids. For example, pumps associated with liquid deactivation materials are not used with embodiments of the steam injection system. Finally, use of the disclosed techniques may enable the amount of steam injected into the mixture to be adjusted faster and more easily to changes in the amount of the catalyst, co-catalyst, additive, or any combination thereof, present in the slurry.

FIG. 1 depicts an embodiment of a manufacturing system 10 that employs catalysts to produce a polymer product through chemical reactions. In particular, FIG. 1 is a schematic representation of a manufacturing process for producing polyolefins, such as polyethylene homopolymer, copolymer, terpolymer, among others. Although the deactivation techniques described herein are generally described with respect to polyolefin production, the techniques can be applied to other types of polymer production.

As shown in FIG. 1, the manufacturing system 10 includes a polymerization reactor 20, which receives various feedstocks, such as a monomer 12, a diluent 14, a catalyst 16, an alkyl 18 (e.g., a co-catalyst), or any combination thereof. In certain embodiments, the various feedstocks may pass through one or more feed systems where the feedstocks may be stored, treated, conditioned, prepared, activated, processed, metered, controlled, or any combination thereof, prior to introduction into the polymerization reactor 20. The monomer 12 may include one or more monomers, comonomers, or both, such as, but not limited to, ethylene, propylene, butene, hexene, octene, decene, and so forth. The diluent 14 may include one or more diluents, such as, but not limited to, an inert hydrocarbon that is liquid at reaction conditions, such as isobutane, propane, n-butane, n-pentane, i-pentane, neopentane, n-hexane, n-heptane, cyclohexane, cyclopentane, methylcyclopentane, or ethylcyclohexane, among others. In certain embodiments, the diluent 14 may be employed to suspend particles of the catalyst 16, alkyl 18, polymer, or any combination thereof, within the polymerization reactor 20.

Examples of the catalyst 16 include, but are not limited to, metallocene catalysts, Ziegler-Natta catalysts, chromium-based catalysts, vanadium-based catalysts, nickel-based catalysts, or a combination thereof, among others. Examples of chromium-based catalysts include, but are not limited to, chrome, chromocene, chrome titanium, chrome silica, chrome with aluminum phosphate, and so forth. In certain embodiments, the catalyst 16 may be diluted in a diluent or solvent. Examples of the solvent include, but are not limited to, comonomers, such as those listed above, 1-hexene, cyclohexane, heptane, an alkene, an alkane, a cycloalkene, a cycloalkane, isobutane, or any combination thereof. Examples of the alkyl 18 include, but are not limited to, organometallic compounds, such as triisobutylaluminum, triethylaluminum or tri-ethyl boron, alkyl aluminum compounds, methyl aluminoxane, and so forth. In further embodiments, the polymerization reactor 20 may also receive other materials, such as, but not limited to, chain transfer agents (e.g. hydrogen), other co-catalysts, other additives, or any combination thereof. Selection of the specific type and amount of catalyst 16, alkyl 18, other additives, or any combination thereof, may be based on the desired amount, characteristics, or both, of the polymers produced by the manufacturing system 10.

The manufacturing system 10 can include one or more polymerization reactors 20, such as liquid-phase reactors, gas-phase reactors, or a combination thereof. Multiple reactors 20 may be arranged in series, in parallel, or in any other suitable combination or configuration. Within the polymerization reactor 20, the monomer 12 (e.g., one or more monomers, comonomers, or both) may be polymerized to form a product slurry 24 containing polymer particles, typically called fluff or granules. According to certain embodiments, the monomer 12 may include 1-olefins having up to 10 carbon atoms per molecule and typically no branching nearer the double bond than the 4-position. For example, the monomer 12 may include monomers and comonomers such as ethylene, propylene, butene, 1-pentene, 1-hexene, 1-octene, 1-decene, or any combination thereof. The polymer particles in the product slurry 24 may possess one or more melt, physical, rheological, or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired properties of the polymer particles in the product slurry 24.

The product slurry 24, which includes the formed polymer particles, as well as non-polymer components, such as unreacted monomer 12, diluent 14, residual catalyst 16, and residual alkyl 18, exits the polymerization reactor 20 through an outlet 22 and enters a slurry handling system 26. The outlet 22 may be any opening formed in the polymerization reactor 20 that enables the product slurry 24 to exit from the polymerization reactor 20. For example, the outlet 22 may be an opening formed in an elbow, tee, or pipe segment of the polymerization reactor 20. The slurry handling system 26 may include various equipment for receiving the product slurry 24 before transferring material to a diluent and monomer recovery system 30. For example, as discussed in detail below, the slurry handling system 26 may include at least one of a continuous take-off valve, a product take-off valve, a settling leg, or any combination thereof. In certain embodiments, the product slurry 24 may be transferred to the slurry handling system 26 in a batch-wise manner. In other embodiments, the slurry handling system 26 may be used to adjust a flow rate of the material leaving the slurry handling system 26.

A mixture 28 from the slurry handling system 26 may be subsequently processed, such as by the diluent and monomer recovery system 30, to separate non-polymer components 32 (e.g., diluent 14 and unreacted monomer 12) from a polymer fluff 34. In certain embodiments, the mixture 28 may have the same composition as the product slurry 24, but may have different physical properties. For example, the pressure of the product slurry 24 entering the slurry handling system 26 may be greater than the pressure of the mixture 28 leaving the system 26, which may be caused by a pressure drop across a valve, for example. This pressure drop may result in certain components of the product slurry 24 vaporizing or flashing into a gas or vapor. Thus, while the product slurry 24 may include solid polymer particles suspended in a liquid, the mixture 28 may include the solid polymer particles together with a liquid phase, a vapor phase, or both. In certain embodiments, the non-polymer components 32 separated by the diluent and monomer recovery system 30 may be further processed, such as by a fractionation system, to remove undesirable heavy and light components before being returned to the polymerization reactor 20. In certain embodiments, the non-polymer components 32 may recycle directly to the polymerization reactor 20 via the one or more feed systems associated with the polymerization reactor 20.

The polymer fluff 34 exits the diluent and monomer recovery system 30 and enters various systems, such as a product recovery system, an extrusion system, a loadout system, or any combination thereof, to produce extruded polymer pellets. Examples of polymer pellets that may be produced by the manufacturing system 10 include, but are not limited to, low density polyethylene (LDPE), linear low density polyethylene (LLDPE), medium density polyethylene (MDPE), high density polyethylene (HDPE), and enhanced polyethylene such as bimodal or multimodal grades. The various types and grades of polyethylene pellets may be marketed, for example, under the brand names Marlex® polyethylene or MarFlex® polyethylene of Chevron-Phillips Chemical Company, LP, of The Woodlands, Tex., USA.

The produced polymer (e.g., polyethylene) pellets can be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys, and an array of containers and plastic products. Further, the products and components formed from the polymer pellets may be further processed and assembled prior to distribution and sale to the consumer. For example, the polymer pellets are generally subjected to further processing, such as blow molding, injection molding, rotational molding, blown film, cast film, extrusion (e.g., sheet extrusion, pipe and corrugated extrusion, coating/lamination extrusion, etc.), and so on.

In the embodiment illustrated by FIG. 1, a steam injection system 36 injects steam 38 into the mixture 28 from the slurry handling system 26. In other words, the steam injection system 36 injects the steam 38 into the mixture 28 downstream of the slurry handling system 26. The injected steam 38 may be used to deactivate certain components of the mixture 28, such as, but not limited to, the catalyst 16 and the alkyl 18. As the catalyst 16, the alkyl 18, or both may be used to affect the rate of polymerization within the polymerization reactor 20, deactivation of the catalyst 16, the alkyl 18, or both by the steam 38 may reduce or stop the rate of polymerization in the mixture 28. Thus, continued polymerization of the monomer 12 may be reduced or prevented from occurring within the diluent and monomer recovery system 30, which may provide several benefits in the operation of the diluent and monomer recovery system 30. For example, avoiding undesired polymerization in the diluent and monomer recovery system 30 may prevent operational issues associated with the formation of polymer fluff 34 in portions of the diluent and monomer recovery system 30 not designed for handling the polymer fluff 34.

In addition, use of the steam 38 as the deactivation material in the manufacturing system 10 may offer several benefits compared to traditional deactivation materials. For example, the steam 38 may be better distributed throughout the mixture 28 than a liquid, thereby enabling less material to be used because of the improved mixing of the steam 38 with the mixture 28. Further, the temperature of the steam 38 may enhance the deactivation of the catalyst 16, the alkyl 18, or both. For example, less steam 38 may be used to deactivate the alkyl 18 compared to deactivating the alkyl 18 using liquid water that is at a lower temperature than the steam 38. Specifically, the deactivation reaction that occurs when the alkyl 18 is deactivated with liquid water may be represented by the following chemical equation:

$$R_3Al+3H_2O(l)\rightarrow Al(OH)_3+3RH+\text{heat} \qquad \text{(EQUATION 1)}$$

where R is an alkyl substituent, such as a butyl group or ethyl group, $R_3Al$ is the alkyl 18, such triisobutylaluminum or triethylaluminum, $H_2O(l)$ is liquid water, $Al(OH)_3$ is aluminum hydroxide, RH is an alkane, such as butane or ethane, and heat represents the heat generated by the chemical reaction. According to Equation 1, three moles of water are used to deactivate one mole of the alkyl 18. When steam 38 is used to deactivate the alkyl 18, the deactivation reactions that occur may be represented by the following chemical equations:

$$2R_3Al+H_2O(g)\rightarrow R_2AlOAlR_2+2RH \quad \text{(EQUATION 2)}$$

$$R_2AlOAlR_2\rightarrow R_3Al+RAlO \quad \text{(EQUATION 3)}$$

where $H_2O(g)$ is the steam 38, $R_2AlOAlR_2$ is bis(dialkylaluminum)oxide, and RAlO is an alkylalumoxane. Equation 2 occurs with the slow addition of the steam 38 to the alkyl 18, and Equation 3 occurs upon heating above approximately 100 degrees Celsius, as provided by the steam 38. According to Equations 2 and 3, one mole of steam is used to deactivate one mole of the alkyl 18. Thus, the deactivation of the alkyl 18 using steam 38 is more efficient than deactivation using water. In addition, injection of the steam 38 may utilize less equipment than the injection of traditional deactivation materials, such as liquid water. Specifically, the injection of steam 38 may be controlled using a single control valve while the injection of liquid water and other liquids may require a pump and a control valve. Thus, deactivation of the alkyl 18 using steam 38 may involve fewer capital expenditures than deactivation using liquid water.

Returning to FIG. 1, operating conditions within the manufacturing system 10 may be controlled to produce polymer fluff 34 with desired properties. For example, a control system or controller 40 can be employed to control operating conditions within the manufacturing system 10, such as operating conditions of the polymerization reactor 20, slurry handling system 26, diluent and monomer recovery system 30, steam injection system 36, or any combination thereof. For example, the controller 40 may be employed to adjust the flow rate or other properties (e.g., pressure or temperature) of the steam 38 injected into the mixture 28. Moreover, the controller 40 may be employed to monitor and adjust operating conditions within the polymerization reactor 20, steam injection system 36, or both, such as temperatures, pressures, flow rates, production rate, among others. According to certain embodiments, the controller 40 may receive input signals 42 (e.g., feedback) from sensors (e.g., temperature sensors, pressure sensors, or flow transducers) within the polymerization reactor 20 that are indicative of operating conditions and may then generate control signals 44 (e.g., output signals) to adjust operating conditions of the steam injection system 36, as described in detail below. For example, feedback from the polymerization reactor 20 (e.g., input signals 42) indicative of a process variable measured by a sensor may be compared to a setpoint of the controller 40, which then sends the control signal 44 to a control device (e.g., a control valve) to cause a change in the flow rate of the steam 38 injected by the steam injection system 36. Under certain circumstances the steam injection system 36 may be configured to inject liquid water and the controller 40 may be used to adjust the flow rate of injected liquid water based on feedback indicative of the polymerization characteristic.

According to certain embodiments, the controller 40 may include or be part of a Distributed Control System (DCS), which may include one or more automation controllers, microprocessors, instruction set processors, graphics processors, analog to digital converters, interface boards, or related chip sets. Further, the controller 40 may cooperate with storage that stores executable code, data, and instructions for the controller 40. For example, the storage may include a non-transitory computer-readable medium storing machine-readable code for injecting the steam 38 at a desired flow rate or pressure based on measured process variables (e.g., polymerization characteristics), wherein "non-transitory" merely indicates that the storage is not a wave. The storage may include volatile memory, such as random access memory, or non-volatile memory, such as read only memory, flash memory, a hard drive, or any other suitable optical, magnetic, or solid-state computer readable media, as well as a combination thereof. The controller 40 may also include a display and a user interface. According to certain embodiments, the display and the user interface may be part of an operator workstation. The display may display a variety of information about the manufacturing system 10. For example, the display may display graphs, trends, mass balances, energy balances, process data, such as measured process variables, predictive data, among others, that facilitate user monitoring and control of the manufacturing system 10.

According to certain embodiments, the display may display screens of the user interface that facilitate entry of user inputs. For example, a user may enter desired operating parameters (e.g., setpoints) or adjustments that should be made to the manufacturing system 10. In certain embodiments, a user may review an essentially instantaneous reaction rate or trend shown on the display and may enter a desired flow rate of steam 38. However, in other embodiments, at least some of the operating conditions may be adjusted automatically by the controller 40. For example, in certain embodiments, the controller 40 may automatically adjust the flow rate of steam 38 injected into mixture 28 based on a measured or calculated polymerization characteristic.

Use of the controller 40 to control the steam injection system 36 may offer several benefits compared to the operation of traditional deactivation systems. For example, the controller 40 may be used to adjust the flow rate of the steam 38 in response to changes in the polymerization reactor 20. Specifically, when the amount of the catalyst 16, the alkyl 18, or both in the polymerization reactor 20 decreases, the controller 40 may adjust the steam injection system 36 to inject less steam 38. Similarly, when the amount of the catalyst 16, the alkyl 18, or both in the polymerization reactor 20 increases, the controller 40 may adjust the steam injection system 36 to increase the amount of the injected steam 38. Thus, the controller 40 may be used to quickly and accurately adjust the amount of the injected steam 38 in response to changes in the polymerization reactor 20, such as fluctuations in the catalyst 16, the alkyl 18, the production rate, or any combination thereof.

In certain embodiments, the amount of the injected steam 38 may be adjusted by the controller 40 to be substantially equal to a stoichiometric amount of steam 38 to deactivate the catalyst 16, the alkyl 18, or both. A stoichiometric amount of steam 38 refers to the amount of steam 38 used to deactivate the catalyst 16, the alkyl 18, or both, assuming the deactivation chemical reaction proceeds to completion with all of the steam 38 consumed (e.g., no deficiency or excess of the steam 38). By injecting the stoichiometric amount of steam 38, the overall consumption of steam 38 used to deactivate the catalyst 16, the alkyl 18, or both may be reduced, thereby reducing the operating and material costs associated with injecting excessive amounts of the steam 38. In addition, injection of the stoichiometric amount of steam 38 may reduce or help prevent operational issues associated with the accumulation of the steam 38 in the diluent and monomer recovery system 30. For example, large amounts of water in the diluent and monomer recovery system 30 may freeze in condensers, coolers, or other equipment of the diluent and monomer recovery system 30, thereby causing lost production and maintenance costs associated with removing or addressing the frozen water.

In other embodiments, the controller 40 may be used to provide the steam 38 at an excess amount compared to the stoichiometric amount to help ensure that substantially all of the catalyst 16, alkyl 18, or both is deactivated. For example, use of a controlled excess amount of steam 38 may help overcome any deficiencies in mixing of the steam 38 with the mixture 28 or any other issues that may hinder the progress of the deactivation chemical reaction. In one embodiment, the controller 40 may be used to provide an excess water ratio of approximately 100 percent, which may refer to the injection of approximately twice the stoichiometric amount of the steam 38. In other embodiments, the controller 40 may be used to inject the steam 38 at an excess water ratio of less than approximately 100 percent based on the stoichiometry of the catalyst 16, the alkyl 18, or both, such as excess water ratios of less than approximately 50 percent, 25 percent, 10 percent, or 5 percent. Larger excess water ratios above approximately 100 percent may be associated with freezing issues in the diluent and monomer recovery system 30 and may be avoided in the disclosed embodiments by using the controller 40 to maintain the excess water ratio at less than approximately 100 percent based on the stoichiometry of the catalyst 16, the alkyl 18, or both.

Figure 2:
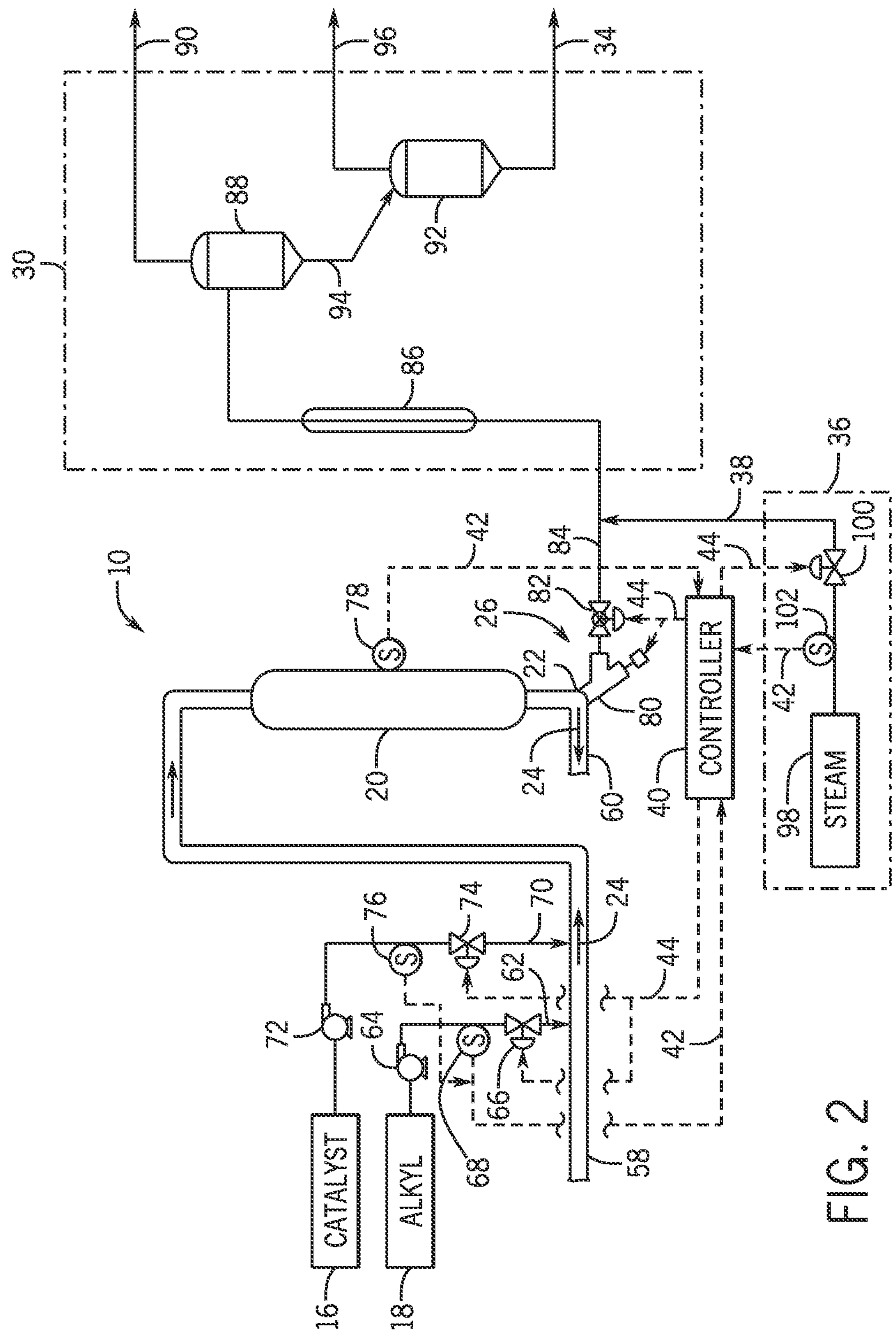
FIG. 2 is a schematic flow diagram of an embodiment of a steam injection system that may be employed in the polyolefin manufacturing system of FIG. 1, in accordance with present embodiments.

FIG. 2 depicts an embodiment of the manufacturing system 10 with the steam injection system 36 in accordance with the present disclosure. In the embodiment illustrated by FIG. 2, an inlet conduit 58 conveys the monomer 12, diluent 14, catalyst 16, alkyl 18, or any combination thereof, to the polymerization reactor 20 and an outlet conduit 60 conveys the product slurry 24 from the polymerization reactor 20. For example, the inlet and outlet conduits 58 and 60 may be used to couple the polymerization reactor 20 to other polymerization reactors configured in a series or parallel arrangement. An alkyl injection conduit 62 may be coupled to the inlet conduit 58 to inject the alkyl 18 into the product slurry 24, which may come from another upstream polymerization reactor 20 or be recycled from the outlet conduit 60 of the illustrated reactor 20. In certain embodiments, an alkyl pump 64 may be used to transfer the alkyl 18 through the alkyl conduit 62. Additionally, an alkyl control valve 66 may be used to adjust the flow rate of the injected alkyl 18. An alkyl sensor 68 may provide information regarding the injected alkyl 18 to the controller 40 via the associated input signal 42. For example, the alkyl sensor 68 may indicate an alkyl concentration, an alkyl flow rate, an alkyl temperature, or any combination thereof. Any one or more of these properties or variables may be considered to be a polymerization characteristic that is used by the controller 40 in controlling the steam injection system 36.

In a similar manner, a catalyst injection conduit 70 may be used to inject the catalyst 16 into the inlet conduit 58. In certain embodiments, a catalyst pump 72 may be used to convey the catalyst 16 through the catalyst conduit 70. In addition, a catalyst control valve 74 may be used to control a flow rate of the injected catalyst 16 and a catalyst sensor 76 may be used to indicate a property of the injected catalyst 16 to the controller 40 via the associated input signal 42. The catalyst sensor 76 may indicate a catalyst concentration, a catalyst flow rate, a catalyst temperature, a catalyst component concentration, or any combination thereof. In certain embodiments, a mixture of different catalysts 16 may be injected into the inlet conduit 58. Thus, the catalyst component concentration may refer to a particular concentration of one of the catalysts 16 injected into the inlet conduit 58. Any one or more of these catalyst-related properties or variables may also be considered to be a polymerization characteristic that is used by the controller 40 to control the steam injection system 36.

The polymerization reactor 20 may include a reactor sensor 78 to provide an indication of one or more properties or characteristics of the polymerization reactor 20 to the controller 40 via the associated input signal 42. For example, the reactor sensor 78 may indicate a polymerization reactor flow rate, a polymerization reactor composition, a polymerization reactor temperature, a polymer production rate, a polymer solids concentration, or any combination thereof. Any one or more of these properties or variables may also be considered to be a polymerization characteristic that is used by the controller 40.

In certain embodiments, various flow rate, composition, or temperature sensors disposed throughout the manufacturing system 10, such as the sensors 68, 76, or 78, may be used to perform a heat balance calculation (e.g., an energy balance) or a mass balance calculation (e.g., material balance) with respect to the polymerization reactor 20. The heat balance calculation may be based on the first law of thermodynamics, which states that energy cannot be created nor destroyed, and the mass balance calculation may be based on the application of conservation of mass to a physical system. The results or output of the heat balance calculations, mass balance calculations, or both may also be provided to the controller 40 to be used in controlling the steam injection system 36 and thus, may also be considered to be polymerization characteristics. In general, the various sensors of the manufacturing system may measure at least a component of the value of the polymerization characteristic.

In some embodiments, the heat balance or the mass balance may be used to calculate a catalyst productivity, defined as a mass flow rate of the polymer (e.g., polymer fluff 34) produced by the polymerization reactor 20 divided by a mass flow rate of the catalyst 16 injected into polymerization reactor 20. In other embodiments, other techniques may be used to determine or estimate the catalyst productivity. As defined, the catalyst productivity provides an indication of the amount of catalyst 16 present in the polymerization reactor 20 with respect to the polymer fluff 34. The calculated catalyst productivity may then be provided to the controller 40 to adjust the flow rate of the steam 38 injected by the steam injection system 36 and thus, may also be considered a polymerization characteristic. For example, as the catalyst productivity increases (e.g., less catalyst 16), the mass of the injected steam 38 may be decreased by the controller 40. Similarly, as the catalyst productivity decreases (e.g., more catalyst 16), the amount of the injected steam 38 may be increased by the controller 40.

In the embodiment illustrated by FIG. 2, the slurry handling system 26 is coupled to the outlet 22 of the polymerization reactor 20. Specifically, the outlet is formed near an elbow of the outlet conduit 60. As illustrated in FIG. 2, the slurry handling system 26 is a continuous take-off system that includes an isolation valve 80, such as a "ram"-type valve, and a continuous take-off valve 82. The ram valve 80 may or may not have an extension into the outlet conduit 60 and may or may not be angled to enhance solids removal, depending on the placement of the ram valve 80 on the outlet conduit 60 and the desired characteristics of the withdrawn mixture 28. The continuous take-off valve 82 may be used to continuously withdraw the mixture 28 from the outlet 22. In certain embodiments, the continuous take-off valve 82 may be a v-ball valve. The valves 80 and 82 may be referred to as a solids concentrator because operation of the valves 80 and 82 may result in a discharge of a higher average solids concentration of the mixture 28 relative to the average solids concentration of the product slurry circulating in the polymerization reactor 20. The slurry handing system 26 may then control, using the v-ball valve 82, the flow of the mixture 28 through a mixture conduit 84 (e.g., a transfer line) fluidly coupling the slurry handling system 26 to the diluent and monomer recovery system 30. In other embodiments, the continuous take-off system may be configured differently or have different components than those shown in FIG. 2.

The mixture 28 from the polymerization reactor 20 may flow through an in-line flash heater 86 and into a separation vessel 88. The in-line flash heater 86 may include two coaxial conduits with steam or steam condensate, for example, used as a heating medium in the annular space between the two coaxial conduits to provide indirect heating to the mixture 28 flowing through the innermost of the two coaxial conduits. Thus, the polymerization reactor 20 effluent (e.g., mixture 28) is heated to generate a two-phase mixture of vapor and solid phases that includes the vaporized portion of the mixture 28 and the polymer fluff 34, which is then introduced into the separation vessel 88. In other embodiments, the mixture 28 leaving the in-line flash heater 86 may still include a liquid phase and thus, may be described as a three-phase mixture. In certain embodiments, the in-line flash heater 86 may be used to maintain a temperature of the mixture 28 leaving the heater 86 or a temperature of the mixture 28 flowing through the heater 86 at a value of less than approximately 100 degrees Celsius. Although the steam 38 is shown being injected into the mixture conduit 84 in FIG. 2, in other embodiments, the steam 38 may also be injected into the in-line flash heater 86 or elsewhere downstream of the slurry handling system 26.

In the separation vessel 88, most of the non-solid components of the mixture 28 are withdrawn overhead as vapor in the flash gas 90. In polyethylene production, this vapor is typically primarily diluent 14, such as isobutane or other diluents 14 previously mentioned. It may also contain most of the unreacted monomer 12 (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined at those light components with lower boiling points than the diluent 14 employed. In contrast heavy components or "heavies" may be defined as those components having higher boiling points than the diluent 14. A level or volume of polymer fluff 34 may be maintained in the separation vessel 88 to give additional residence time of the fluff in the chamber 88 to facilitate separation of liquid and vapor entrained in the porous fluff particles.

The flash gas 90 may be processed in equipment such as cyclones, bag filters, etc., where entrained fluff solids are removed and returned to the separation vessel 88 or to downstream equipment, such as the purge column discussed below. The flash gas 90 may also travel through a deoxygenation bed, for example. Furthermore, the flash gas 90 may be cooled or condensed in a heat exchanger (e.g., shell-and-tube construction) prior to its recycle to the polymerization reactor 20. In addition, the steam 38 injected by the steam injection system 36 is typically completely removed, or at least substantially removed, from any recovered material (e.g., monomer 12 or diluent 14) recycled to the polymerization reactor 20.

As for the solids (polymer) in the separation vessel 88, they are withdrawn with a small amount of entrained diluent 14 (and monomer 12) and sent to a purge column 92 via solids discharge 94. The solids discharge conduit 94 may include valve configurations that allow polymer to flow downward through the conduit 94 while reducing the potential for vapor to flow between the purge column 92 and the separation vessel 88. For example, one or more rotary or cycling valves may be disposed on the solids discharge conduit 94. In other embodiments, a level of polymer may be maintained in the separation vessel 88 using a valve located in the solids discharge conduit 94 that continuously discharges the polymer to the purge column 92. Furthermore, a separations vessel may also be disposed on the conduit 94.

The primary solids feed to the purge column 92 is typically the solids discharge 94 (e.g., polymer fluff 34) that exits the separation vessel 88. A purpose of the purge column 92 is to remove residual hydrocarbon from the solids and to provide substantially-clean polymer fluff 34. The fluff 34 may be transported or conveyed to a downstream extrusion/loadout system for conversion to pellets, and for distribution and sale as polyolefin pellet resin to customers. In general, the treated polymer particles discharged from purge column 92 as polymer fluff 34 may be processed in a conventional finishing operation, such as a screw extruder, in the extrusion/load out system. In certain embodiments, nitrogen may be circulated through the purge column 92 to remove residual hydrocarbons via overhead discharge 96, which may be further processed before being recycled back to the polymerization reactor 20.

In the embodiment illustrated by FIG. 2, the steam injection system 36 includes a steam source 98 to provide the steam 38 injected downstream of the slurry handling system 26. For example, the steam source 98 may be a plant steam header or other source of steam. The pressure of the steam 30 provided by the steam source 98 may be greater than the pressure of the mixture 28 from the slurry handling system 26 to enable the steam 38 to enter the mixture conduit 84. A steam control valve 100 may be disposed downstream of the steam source 98 and may be used to control the flow rate or the pressure of the injected steam 38. Thus, the steam control valve 100 may be referred to as a flow control valve or pressure control valve. For example, the pressure of the steam 38 injected into the mixture conduit 84 may be adjusted to between approximately 2 megapascals (MPa) to 5 MPa by the steam pressure control valve 100. In addition, a steam sensor 102 may be disposed upstream or downstream of the steam control valve 100 and used to provide an indication of a property of the steam 38, such as, but not limited to a flow rate, a temperature, a pressure, or any combination thereof. For example, the steam sensor 102 may be a mass flow meter, such as an inertial flow meter, a coriolis meter, a thermodynamic meter, or any combination thereof. Such mass flow meters may provide an accurate value of the flow rate of the injected steam 38 to the controller 40, thereby improving control of the deactivation process and helping to reduce or prevent accumulation of water in the diluent and monomer recovery system 30. In further embodiments, the steam 38 may be desuperheated prior to injection.

The steam sensor 102 may provide information regarding the injected steam 38 to the controller 40 via the associated input signal 42 and, in turn, the controller 40 may adjust the steam control valve 100 via the associated control signal 44. Specifically, the controller 40 may adjust the steam control valve 100 based on one or more inputs indicative of a polymerization characteristic, such as, but not limited to, the catalyst productivity, the flow rate of the catalyst 16, the concentration of the catalyst 16, a concentration of a component within the catalyst 16, a flow rate of the polymerization reactor 20, a composition of the polymerization reactor 20, a temperature within the polymerization reactor 20, a first output from a heat balance around the polymerization reactor 20, a second output from a mass balance around the polymerization 20, a concentration of the alkyl 18, a flow rate of the alkyl 18, a polymer production rate, a polymer solids concentration, or any combination thereof. These polymerization characteristics may be provided by various sensors disposed in the manufacturing system 10, such as, but not limited to, sensors 68, 76, 78, and 102. As such, the controller 40 may be used to adjust the flow rate or pressure of the steam 38 such that only as much steam 38 as desired, such as enough steam 38 to deactivate the catalyst 16, the alkyl 18, or both, is provided by the steam injection system 36.

In certain embodiments, the controller 40 may be used to maintain the flow rate of the steam 38 between approximately 0.005 kg/hr to 2 kg/hr using the flow control valve 100 when the catalyst productivity is between approximately 1,000 to 250,000, 10,000 to 100,000, or 25,000 to 50,000, which may indicate desired ranges of operation of the polymerization reactor 20. This range of flow rates of the steam 38 is based on a polymer production rate of approximately 45,359 kg/hr and would be different for other polymer production rates. For this operating condition, values of catalyst productivity less than 1,000 may indicate the presence of excess catalyst 16 in the polymerization reactor 20. Values of catalyst productivity greater than 250,000 may indicate low levels of catalyst 16.

In other embodiments, the controller 40 may be used to maintain the flow rate of the steam 38 between approximately 0.03 kg/hr to 8 kg/hr using the flow control valve when the concentration of the alkyl 18 is between approximately 1 ppm to 500 ppm, or 100 ppm to 200 ppm, which may also indicate desired ranges of operation of the polymerization reactor 20. Again, this range of flow rates of the steam 38 is based on a polymer production rate of approximately 45,359 kg/hr. The desired range of steam 38 may be established to help ensure that all or substantially all of the catalyst 16, alkyl 18, or both is deactivated without resulting in the accumulation of water in the diluent and monomer recovery system 30. In further embodiments, the controller 40 may be used to provide excess steam 38 (e.g., an excess water ratio of less than approximately 100 percent) to help ensure that all or substantially all of the catalyst 16, the alkyl 18, or both is deactivated prior to reaching the diluent and monomer recovery system 30. Therefore, the controller 40 may be used to reduce the overall amount of steam 38 injected into the mixture 28, thereby helping to prevent operational issues associated with the accumulation of water in the diluent and monomer recovery system 30.

Table 1 provides data for different operating points of the controller 40 when the catalyst 16 is a Ziegler-Natta catalyst.

TABLE 1

| Catalyst Productivity | Ti in Catalyst (wt %) | Stoichiometric Amount of Steam | 5% | 10% | 25% | 50% | 100% |
|---|---|---|---|---|---|---|---|
| 50,000 | 4.0 | 0.04 | 0.04 | 0.04 | 0.05 | 0.06 | 0.08 |
| 25,000 | 4.0 | 0.08 | 0.09 | 0.09 | 0.10 | 0.12 | 0.16 |
| 10,000 | 4.0 | 0.20 | 0.21 | 0.22 | 0.26 | 0.31 | 0.41 |
| 25,000 | 2.0 | 0.04 | 0.04 | 0.04 | 0.05 | 0.06 | 0.08 |
| 25,000 | 4.0 | 0.08 | 0.09 | 0.09 | 0.10 | 0.12 | 0.16 |
| 25,000 | 6.0 | 0.12 | 0.13 | 0.13 | 0.15 | 0.18 | 0.25 |

In Table 1, the catalyst productivity is the mass of polymer divided by the mass of the Ziegler-Natta catalyst, the Ti in catalyst (wt %) is the weight percent of titanium present in the Ziegler-Natta catalyst, the stoichiometric amount of steam is the mass flow rate of steam 38 in kg/hr used to deactivate the Ziegler-Natta catalyst assuming the deactivation chemical reaction proceeds to completion, and the remaining columns show the mass flow rate of steam 38 in kg/hr used to deactivate the Ziegler-Natta catalyst at excess water ratios of approximately 5%, 10%, 25%, 50%, 100%, and 200%. The calculations used to determine the mass flow rates of steam 38 in Table 1 are based on a mass flow rate of polymer produced (e.g., polymer production rate) of approximately 45,359 kg/hr, a steam 38 to titanium stoichiometric deactivation ratio of approximately 3 moles to 1 mole, and the molecular weights of titanium and water. Thus, for different polymer production rates, the flow rates of steam 38 would be different from those shown in Table 1.

As shown in the first three rows of Table 1, as the catalyst productivity decreases, the mass flow rates of steam 38 used for deactivation increase. In other words, the decreasing values of catalyst productivity represent higher concentrations of catalyst 16 within the polymerization reactor 20. Thus, additional steam 38 is used to deactivate the greater mass flow rates of the catalyst 16. As shown in the last three rows of Table 1, as the weight percent of titanium in the catalyst 16 increases, the mass flow rates of steam 38 used for deactivation also increase. Thus, additional steam 38 is used to deactivate the greater amount of titanium present in the catalyst 16. In addition, as shown in the last six columns of Table 1, as the excess water ratios increase, the mass flow rates of steam 38 used for deactivation increase. For example, the mass flow rates of steam 38 used at an excess water ratio of approximately 100% are approximately twice that of the stoichiometric amounts of steam 38.

The controller 40 may be used to operate the manufacturing system 10 at any of the operating points in Table 1 based on feedback from one or more sensors (e.g., sensors 68, 76, 78, or 102) of the manufacturing system 10. For example, the feedback from the sensors may indicate that the manufacturing system 10 is operating with a catalyst productivity of approximately 50,000 and a polymer production rate of approximately 45,359 kg/hr. In response to an excess water ratio setpoint of approximately 100%, which may be programmed into the controller 40 or input by an operator, the controller 40 may adjust the steam control valve 100 until the steam sensor 102 indicates a mass flow rate of steam 38 of approximately 0.08 kg/hr. If the feedback from the sensors indicates that the catalyst productivity has decreased to approximately 25,000, the controller 40 may then automatically adjust the steam control valve 100 until the steam sensor 102 indicates a mass flow rate of steam 38 of approximately 0.16 kg/hr, assuming the excess water ratio setpoint remains at approximately 100%. Thus, the controller 40 may adjust the amount of steam 38 used to deactivate the catalyst 16 to maintain the desired excess water ratio, thereby helping to ensure that all or substantially all of the catalyst 16 is deactivated while also reducing the accumulation of water in the diluent and monomer recovery system 30 compared to traditional deactivation techniques. In other embodiments, the controller 40 may adjust the amount of steam 38 used to deactivate the catalyst 16 to maintain the stoichiometric amount of steam 38 (e.g., no excess water).

Table 2 provides data for different operating points of the controller 40 when the catalyst 16 is a metallocene catalyst.

TABLE 2

| Catalyst Productivity | Zr in Catalyst (wt %) | Stoichiometric Amount of Steam | 5% | 10% | 25% | 50% | 100% |
|---|---|---|---|---|---|---|---|
| 30,000 | 1.0 | 0.01 | 0.01 | 0.01 | 0.01 | 0.02 | 0.02 |
| 20,000 | 1.0 | 0.02 | 0.02 | 0.02 | 0.02 | 0.03 | 0.04 |
| 10,000 | 1.0 | 0.04 | 0.04 | 0.04 | 0.04 | 0.05 | 0.07 |
| 20,000 | 0.5 | 0.01 | 0.01 | 0.01 | 0.01 | 0.01 | 0.02 |
| 20,000 | 1.0 | 0.02 | 0.02 | 0.02 | 0.02 | 0.03 | 0.04 |
| 20,000 | 1.5 | 0.03 | 0.03 | 0.03 | 0.03 | 0.04 | 0.05 |

In Table 2, the Zr in catalyst (wt %) is the weight percent of zirconium present in the metallocene catalyst. The calculations used to determine the mass flow rates of steam 38 in Table 2 are based on a steam 38 to zirconium stoichiometric deactivation ratio of approximately 4 moles to 1 mole and the molecular weight of zirconium. In other respects, Table 2 is similar to Table 1. Thus, using the data from Table 2, the controller 40 may be used to adjust the mass flow rate of steam 38 to be between approximately 0.01 kg/hr to 0.07 kg/hr (for a polymer production rate of approximately 45,359 kg/hr) depending on the catalyst productivity and the desired excess water ratio (if any).

Table 3 provides data for different operating points of the controller 40 when the catalyst 16 is a chromium-based catalyst.

TABLE 3

| Catalyst Prod. | Cr in Catalyst (wt %) | Steam/Cr mole/mole | Stoich. Amount of Steam | 5% | 10% | 25% | 50% | 100% |
|---|---|---|---|---|---|---|---|---|
| 3,000 | 1.0 | 6 | 0.31 | 0.33 | 0.35 | 0.39 | 0.47 | 0.63 |
| 2,000 | 1.0 | 6 | 0.47 | 0.49 | 0.52 | 0.59 | 0.71 | 0.94 |
| 1,000 | 1.0 | 6 | 0.94 | 0.99 | 1.04 | 1.18 | 1.41 | 1.88 |
| 2,000 | 0.5 | 6 | 0.24 | 0.25 | 0.26 | 0.29 | 0.35 | 0.47 |
| 2,000 | 1.0 | 6 | 0.47 | 0.49 | 0.52 | 0.59 | 0.71 | 0.94 |
| 2,000 | 1.5 | 6 | 0.71 | 0.74 | 0.78 | 0.88 | 1.06 | 1.41 |
| 2,000 | 1.0 | 2 | 0.16 | 0.16 | 0.17 | 0.20 | 0.24 | 0.31 |
| 2,000 | 1.0 | 3 | 0.24 | 0.25 | 0.26 | 0.29 | 0.35 | 0.47 |
| 2,000 | 1.0 | 6 | 0.47 | 0.49 | 0.52 | 0.59 | 0.71 | 0.94 |

In Table 3, the Cr in catalyst (wt %) is the weight percent of chromium present in the chromium-based catalyst and the steam/Cr mole/mole is the steam 38 to chromium stoichiometric deactivation ratio, which varies depending on the valence of chromium used in the catalyst 16. The calculations used to determine the mass flow rates of steam 38 in Table 3 are based on the molecular weight of chromium. In other respects, Table 3 is similar to the previous Tables. For example, as shown in the last three rows of Table 3, as the steam 38 to chromium stoichiometric deactivation ratio of the catalyst 16 increases, the mass flow rate of steam 38 used for deactivation also increases. Thus, additional steam 38 is used to deactivate the higher activity catalyst 16. Using the data from Table 3, the controller 40 may be used to adjust the mass flow rate of steam 38 to be between approximately 0.16 kg/hr to 1.88 kg/hr (for a polymer production rate of approximately 45,359 kg/hr) depending on the catalyst productivity, stoichiometric deactivation ratio, and the desired excess water ratio (if any).

Table 4 provides data for different operating points of the controller 40 when the alkyl 18 is triethylaluminum (TEAl).

TABLE 4

| TEAl/RX Feed Component | Steam/TEAl | Stoichiometric Amount of Steam | 5% | 10% | 25% | 50% | 100% |
|---|---|---|---|---|---|---|---|
| 10 | 1 | 0.06 | 0.07 | 0.07 | 0.08 | 0.10 | 0.13 |
| 25 | 1 | 0.16 | 0.17 | 0.18 | 0.20 | 0.24 | 0.32 |
| 50 | 1 | 0.32 | 0.34 | 0.35 | 0.40 | 0.48 | 0.64 |
| 100 | 1 | 0.64 | 0.68 | 0.71 | 0.81 | 0.97 | 1.29 |
| 200 | 1 | 1.29 | 1.35 | 1.42 | 1.61 | 1.93 | 2.58 |
| 10 | 3 | 0.19 | 0.20 | 0.21 | 0.24 | 0.29 | 0.39 |
| 25 | 3 | 0.48 | 0.51 | 0.53 | 0.60 | 0.73 | 0.97 |
| 50 | 3 | 0.97 | 1.02 | 1.06 | 1.21 | 1.45 | 1.93 |
| 100 | 3 | 1.93 | 2.03 | 2.13 | 2.42 | 2.90 | 3.87 |
| 200 | 3 | 3.87 | 4.06 | 4.25 | 4.83 | 5.80 | 7.73 |

In Table 4, the TEAl/RX (where RX stands for reactor) feed component is the concentration of the TEAl, expressed in ppm, in a reactor feed component carrier, such as the diluent 14, monomer 12, or both, and steam/TEAl is the mole/mole ratio of steam to TEAl. Typically, the alkyl 18 may be mixed with the reactor feed component carrier and the mixture injected into the polymerization reactor 20. The calculations used to determine the mass flow rates of steam 38 in Table 4 are based on a ratio of the flow rate of reactor feed component carrier (e.g., diluent 14, monomer 12, or both) to polymer production rate of approximately 0.9 and the molecular weight of TEAl. In other respects, Table 4 is similar to the previous Tables. For example, as shown in Table 4, as the concentration of TEAl increases (e.g., increases from 10 ppm to 200 ppm), the mass flow rates of steam 38 used for deactivation increases. Thus, additional steam 38 is used to deactivate the greater mass flow rates of the alkyl 18. In addition, as the mole/mole ratio of steam 38 to TEAl increases (e.g., increases from 1 to 3), the mass flow rates of steam 38 used for deactivation increase. Thus, using the data from Table 4, the controller 40 may be used to adjust the mass flow rate of steam 38 to be between approximately 0.06 kg/hr to 7.73 kg/hr (for a polymer production rate of approximately 45,359 kg/hr) depending on the concentration of the TEAl, mole to mole ratio of steam to TEAl, and the desired excess water ratio (if any).

Table 5 provides data for different operating points of the controller 40 when the alkyl 18 is triisobutylaluminum (TiBAl).

TABLE 5

| TiBAl/RX Feed Component | Steam/TiBAl | RX Feed Component/Poly Rate | Stoich Amount of Steam | 5% | 10% | 25% | 50% | 100% |
|---|---|---|---|---|---|---|---|---|
| 10 | 1 | 0.90 | 0.04 | 0.04 | 0.04 | 0.05 | 0.06 | 0.07 |
| 25 | 1 | 0.90 | 0.09 | 0.10 | 0.10 | 0.12 | 0.14 | 0.19 |
| 50 | 1 | 0.90 | 0.19 | 0.19 | 0.20 | 0.23 | 0.28 | 0.37 |
| 100 | 1 | 0.90 | 0.37 | 0.39 | 0.41 | 0.46 | 0.56 | 0.74 |
| 200 | 1 | 0.90 | 0.74 | 0.78 | 0.82 | 0.93 | 1.11 | 1.48 |
| 10 | 3 | 0.90 | 0.11 | 0.12 | 0.12 | 0.14 | 0.17 | 0.22 |
| 25 | 3 | 0.90 | 0.28 | 0.29 | 0.31 | 0.35 | 0.42 | 0.56 |
| 50 | 3 | 0.90 | 0.56 | 0.58 | 0.61 | 0.69 | 0.83 | 1.11 |
| 100 | 3 | 0.90 | 1.11 | 1.17 | 1.22 | 1.39 | 1.67 | 2.22 |
| 200 | 3 | 0.90 | 2.22 | 2.33 | 2.45 | 2.78 | 3.34 | 4.45 |
| 50 | 1 | 0.80 | 0.16 | 0.17 | 0.18 | 0.21 | 0.25 | 0.33 |
| 50 | 1 | 0.85 | 0.17 | 0.18 | 0.19 | 0.22 | 0.26 | 0.35 |
| 50 | 1 | 0.90 | 0.19 | 0.19 | 0.20 | 0.23 | 0.28 | 0.37 |
| 50 | 1 | 0.95 | 0.20 | 0.21 | 0.22 | 0.24 | 0.29 | 0.39 |
| 50 | 1 | 0.97 | 0.20 | 0.21 | 0.22 | 0.25 | 0.30 | 0.40 |
| 50 | 1 | 1.00 | 0.21 | 0.22 | 0.23 | 0.26 | 0.31 | 0.41 |

In Table 5, the TiBAl/RX (where RX stands for reactor) feed component is the concentration of the TiBAl, expressed in ppm, in a reactor feed component carrier, such as the diluent 14, monomer 12, or both, and steam/TiBAl is the mole/mole ratio of steam to TiBAl, and RX feed component/poly rate is the ratio of the reactor feed component carrier to the polymer production rate. The calculations used to determine the mass flow rates of steam 38 in Table 5 are based on the molecular weight of TiBAl. In other respects, Table 5 is similar to the previous Tables. For example, as shown in Table 5, as the concentration of TiBAl increases (e.g., increases from 10 ppm to 200 ppm), the mass flow rates of steam 38 used for deactivation increases. Thus, additional steam 38 is used to deactivate the greater mass flow rates of the alkyl 18. In addition, as the mole/mole ratio of steam 38 to TEAl increases (e.g., increases from 1 to 3), the mass flow rates of steam 38 used for deactivation increase. Further, as the ratio of reactor feed component carrier to polymer production rate increases (e.g., increases from 0.8 to 1), the mass flow rates of steam 38 used for deactivation increase. Thus, using the data from Table 5, the controller 40 may be used to adjust the mass flow rate of steam 38 to be between approximately 0.04 kg/hr to 4.45 kg/hr (for a polymer production rate of approximately 45,359 kg/hr) depending on the concentration of the TiBAl, ratio of reactor feed component carrier to polymer production rate, mole/mole ratio of steam to TiBAl, and the desired excess water ratio (if any). In addition, although the data for the catalyst 16 and the alkyl 18 are presented separately in Tables 1-5, the controller 40 may be configured to adjust the flow rate of steam 38 to deactivate both the catalyst 16 and alkyl 18 when both are used. In other words, the controller 40 may be used to provide both the mass flow rate of steam to deactivate the catalyst 16 and the mass flow rate of steam to deactivate the alkyl 18 when both are used.

Returning to the figures, FIG. 3 is a schematic representation of an exemplary manufacturing system 10 having the steam injection system 36. As illustrated in FIG. 3, the slurry handling system 26 includes a plurality of a settling legs 120 coupled to a plurality of outlets 22 and a plurality of product take-off valves 122 coupled to the mixture conduit 84. In operation, the steam injection system 36 injects the steam 38 into the mixture conduit 84 downstream of the slurry handling system 26. In other embodiments, the steam 38 may also be injected into the in-line flash heater 86 or elsewhere downstream of the slurry handling system 26. In certain embodiments, a plurality of mixture conduits 84 may be coupled to each of the plurality of product take-off valves 122 and the diluent and monomer recovery system 30. In these embodiments, a plurality of steam injection lines may be provided from the steam injection system 36 to each of the plurality of mixture conduits 84. Settling legs 120 are often employed in traditional systems due to their ability, as their name implies, to allow gravity settling at various positions within the polymerization reactor 20, which may result in a mixture 28 with an average solids concentration greater than an average solids concentration of the bulk slurry flowing in the polymerization reactor 20. As shown in FIG. 3, the plurality of settling legs 120 may be disposed along one or more of the horizontal lengths of the polymerization reactor 20, on the bottom elbows of the polymerization reactor 20, or both. Typically, the settling legs 120 are disposed proximate a pump impeller or a tangent of a curvature of the polymerization reactor 20. The position of the settling leg 120 is usually chosen such that the product slurry 24 is captured by the settling legs 120. Once a settling leg 120 is filled, the product take-off valve 122 opens, enabling the mixture 28 to be removed. Specifically, the product take-off valves 122 may fire (open) as a result of exceeding a pressure threshold or based on a timer, thus allowing the mixture 28 to pass through to the mixture conduit 84. The plurality of product take-off valves 122 may be controlled by the controller 40. In other respects, the steam injection system 36 is similar to that discussed in FIG. 2.

FIG. 4 is a flow chart depicting a method 140 for operating the manufacturing system 10 with the steam injection system 36. The method 140 may begin by polymerizing the monomer 12 in the polymerization reactor 20 to produce the product slurry 24 (block 142). Specifically, the monomer 12 may react in the polymerization reactor 20 in the presence of the diluent 14, catalyst 16, alkyl 18, or any combination thereof, to produce the product slurry 24. Next, the product slurry 24 may flow out of the polymerization reactor 20 through the outlet 22 (block 144). As described above, the outlet 22 may be formed in any portion of the polymerization reactor 20, such as in the inlet conduit 58, the outlet conduit 60, or both. Next, the slurry handling system 26 may receive the product slurry 24 from the outlet 22 (block 146). As described above, the slurry handling system 26 may include the continuous take-off system with the ram valve 80 and the v-ball valve 82, the plurality of settling legs 120, the plurality of product take-off valves 122, or any combination thereof. As shown in the previous figures, the slurry handling system 26 may be coupled directly to the outlet 22 or in other embodiments, a short conduit or pipe may be disposed between the outlet 22 and the slurry handling system 26. Next, the mixture 28 from the slurry handling system 26 is conveyed to the diluent and monomer recovery system 30 (block 148). For example, the mixture conduit 84 may be coupled to the slurry handling system 26 and the diluent and monomer recovery system 30 and used to convey the mixture 28 to the diluent and monomer recovery system 30. In addition, steam 38 may be injected into the mixture 28 downstream of the slurry handling system 26 using the steam injection system 36. By injecting the steam 38 into the mixture 28, the catalyst 16, the alkyl 18, other additives, or any combination thereof, present in the mixture 28 may be deactivated prior to reaching the diluent and monomer recovery system 30. In addition, the steam injection system 36 may be controlled using the controller 40, which may receive input signals 42 indicative of one or more polymerization characteristics. Thus, the amount of steam 38 injected by the steam injection system 36 may be controlled to a desired value, thereby improving operation of the diluent and monomer recovery system 30 and other downstream equipment.

Figure 5:
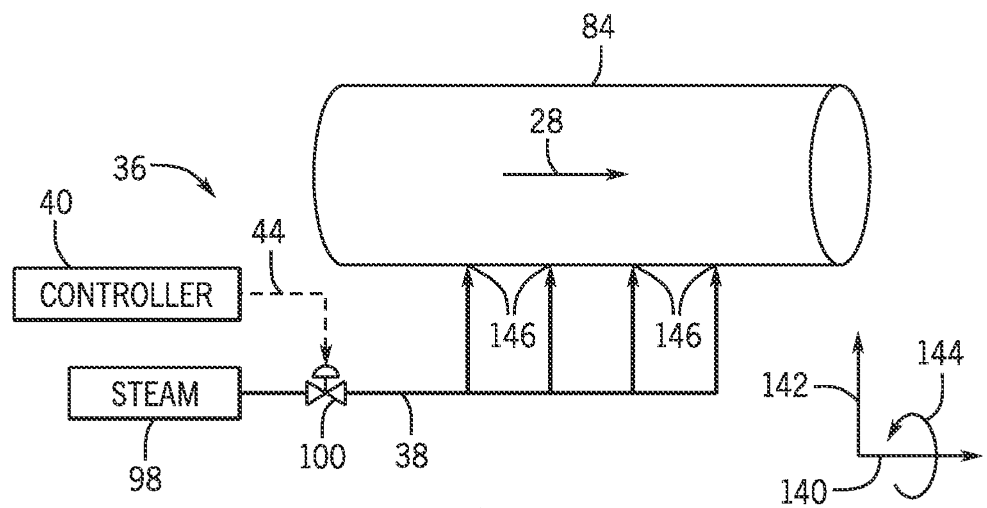
FIG. 5 is a schematic flow diagram of an embodiment of a steam injection system coupled to a mixture conduit in accordance with present embodiments.

FIG. 5 is a schematic diagram of an embodiment of the steam injection system 36. As illustrated in FIG. 5, the axial direction of the mixture conduit 84 is indicated by arrow 140, the radial direction indicated by arrow 142, and the circumferential direction is indicated by arrow 144. As shown in FIG. 5, the steam injection system 36 includes a plurality of steam injection openings 146 disposed along the axial direction 140. Such an arrangement of the plurality of steam injection openings 146 may improve mixing of the steam 38 with the mixture 28. As illustrated, the steam control valve 100 is used to adjust the flow or the pressure of the steam 38 to the plurality of steam injection openings 146. In other embodiments, a plurality of steam control valves 100 may be used for each of the plurality of steam injection openings 146. Thus, the amount of steam 38 injected by each of the plurality of steam injection openings 146 may be individually adjusted by the plurality of steam control valves 100. For example, more or less steam 38 may be injected as the mixture 28 moves in the axial direction 140. As described in detail above, the controller 40 may be used to control the steam control valve 100 or the plurality of steam control valves 100 via the associated control signal 44.

Figure 6:
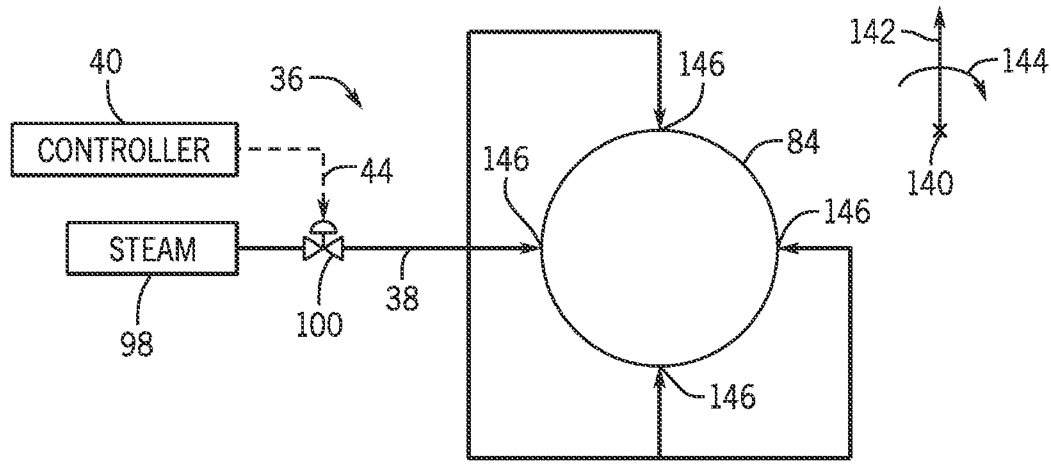
FIG. 6 is a schematic flow diagram of an embodiment of a steam injection system coupled to a mixture conduit in accordance with present embodiments.

FIG. 6 is a schematic diagram of an embodiment of the steam injection system 36. As illustrated in FIG. 6, the plurality of steam injection openings 146 are disposed circumferentially 144 about the mixture conduit 84. Such an arrangement of the plurality of steam injection openings 146 may improve the distribution of the steam 38 within the mixture conduit 84, thereby improving mixing of the steam 38 with the mixture 28. In other embodiments, the number of the plurality of steam injection openings 146 may be different from that shown in FIG. 6. In addition, the spacing, arrangement, or both of the plurality of steam injection openings 146 may be varied to achieve the desired mixing of the steam 38 with the mixture 28. In further embodiments, the arrangement of the plurality of steam injection openings 146 shown in FIG. 5 may be combined in part with the arrangement of the plurality of steam injection openings 146 shown in FIG. 6. In other words, the plurality of steam injection openings 146 may be disposed both along the axial direction 140 and circumferentially 144 about the mixture conduit 84.

ADDITIONAL DESCRIPTION

Systems and methods for polymer manufacturing have been described. The following clauses are offered as further description of the disclosure.

Embodiment 1

A method, comprising: polymerizing a monomer in a polymerization reactor to produce a slurry comprising polyolefin particles and a diluent; flowing the slurry out of the polymerization reactor through an outlet of the polymerization reactor; receiving the slurry from the outlet into a slurry handling system; conveying a first mixture from the slurry handling system to a diluent and monomer recovery system; and injecting steam into the first mixture downstream of the slurry handling system using a steam injection system.

Embodiment 2

The method of embodiment 1, comprising receiving the slurry from the outlet into a continuous take-off of the slurry handling system.

Embodiment 3

The method defined in any preceding embodiment, comprising indicating a flow rate of the steam based on a measurement provided by a steam flow meter of the steam injection system.

Embodiment 4

The method defined in any preceding embodiment, comprising at least one of adjusting a flow rate of the steam using a flow control valve of the steam injection system, adjusting a pressure of the steam using a pressure control valve of the steam injection system, or any combination thereof, based on a value of a polymerization characteristic.

Embodiment 5

The method defined in any preceding embodiment, wherein the polymerization characteristic comprises at least one of a catalyst productivity, a catalyst flow rate, a catalyst concentration, a catalyst component concentration, a polymerization reactor flow rate, a polymerization reactor composition, a polymerization reactor temperature, a first output from a polymerization reactor heat balance, a second output from a polymerization reactor mass balance, an alkyl concentration, an alkyl flow rate, a polymer production rate, a polymer solids concentration, or any combination thereof.

Embodiment 6

The method defined in any preceding embodiment, comprising maintaining the flow rate of the steam between approximately 0.001 kg/hr to 2 kg/hr using the flow control valve when the catalyst productivity is between approximately 1,000 to 250,000.

Embodiment 7

The method defined in any preceding embodiment, comprising maintaining the flow rate of the steam between approximately 0.03 kg/hr to 8 kg/hr using the flow control valve when the alkyl concentration is between approximately 1 ppm to 500 ppm.

Embodiment 8

The method defined in any preceding embodiment, comprising adjusting a pressure of the steam to between approximately 2 MPa to 5 Mpa using the pressure control valve.

Embodiment 9

The method defined in any preceding embodiment, comprising injecting the steam using the steam injection system to maintain a stoichiometric deactivation ratio of water with respect to at least one of a catalyst present in the slurry, or an alkyl present in the slurry, or any combination thereof.

Embodiment 10

The method defined in any preceding embodiment, comprising injecting the steam using the steam injection system to maintain an excess water ratio of less than approximately 100% based on stoichiometry of a catalyst, of an alkyl, or both.

Embodiment 11

The method defined in any preceding embodiment, comprising heating the first mixture using an in-line flash heater of the diluent and monomer recovery system to generate a second mixture comprising the polyolefin particles and at least one of a liquid phase, or a vapor phase, or any combination thereof.

Embodiment 12

The method defined in any preceding embodiment, comprising maintaining a temperature of the second mixture less than approximately 100 degrees Celsius using the in-line flash heater.

Embodiment 13

A system, comprising: a polymerization reactor configured to polymerize a monomer to produce a slurry comprising polyolefin particles and diluent; an outlet of the polymerization reactor configured to enable the slurry to exit the polymerization reactor; a slurry handling system downstream of the outlet, the slurry handling system configured to receive the slurry from the polymerization reactor and configured to provide a mixture to a diluent and monomer recovery system downstream of the slurry handling system; and one or more automation controllers configured to: receive an input indicative of a polymerization characteristic; and activate an output to actuate a steam injection system to inject steam into the mixture downstream of the diluent and monomer recovery system based at least in part on the input.

Embodiment 14

The method or system defined in any preceding embodiment, comprising at least one sensor configured to measure at least a component of the value of the polymerization characteristic.

Embodiment 15

The method or system defined in any preceding embodiment, wherein the polymerization characteristic comprises at least one of a catalyst productivity, a catalyst flow rate, a catalyst concentration, a catalyst component concentration, a polymerization reactor flow rate, a polymerization reactor composition, a polymerization reactor temperature, a first output from a polymerization reactor heat balance, a second output from a polymerization reactor mass balance, an alkyl concentration, an alkyl flow rate, a polymer production rate, a polymer solids concentration, or any combination thereof.

Embodiment 16

The method or system defined in any preceding embodiment, comprising a steam flow control valve configured to adjust a flow rate of the steam based on the output, or a pressure control valve configured to adjust a pressure of the steam based on the output, or any combination thereof.

Embodiment 17

The method or system defined in any preceding embodiment, wherein the one or more automation controllers are configured to control the steam injection system to inject the steam at a stoichiometric deactivation ratio of water with respect to at least one of a catalyst present in the slurry, or an alkyl present in the slurry, or any combination thereof.

Embodiment 18

The method or system defined in any preceding embodiment, wherein the one or more automation controllers are configured to control the steam injection system to inject the steam at an excess water ratio of less than approximately 100% based on stoichiometry of a catalyst, of an alkyl, or both.

Embodiment 19

A system, comprising; a polymerization reactor configured to produce a slurry comprising polyolefin particles and a diluent, wherein the polymerization reactor comprises an outlet configured to enable the slurry to exit the polymerization reactor therethrough; a slurry handling system coupled to the outlet, wherein the slurry handling system is configured to receive the slurry from the polymerization reactor and convey a mixture to a diluent and monomer recovery system; and a steam injection system configured to inject steam into the mixture downstream of the slurry handling system.

Embodiment 20

The method or system defined in any preceding embodiment, wherein the steam injection system comprises a steam flow meter configured to provide an indication of a flow rate of the steam.

Embodiment 21

The method or system defined in any preceding embodiment, wherein the steam flow meter comprises at least one of a mass flow meter, an inertial flow meter, a coriolis meter, or a thermodynamic meter, or any combination thereof.

Embodiment 22

The method or system defined in any preceding embodiment, wherein the steam injection system comprises at least one of a flow control valve configured to adjust a flow rate of the steam, or a pressure control valve configured to adjust a pressure of the steam, or any combination thereof.

Embodiment 23

The method or system defined in any preceding embodiment, comprising an automation controller configured to control the steam injection system to adjust at least one of a flow rate of the injected steam, or a pressure of the injected steam, or any combination thereof, based at least on a feedback signal from a sensor.

Embodiment 24

The method or system defined in any preceding embodiment, wherein the sensor comprises at least one of a catalyst flow rate sensor, a catalyst concentration sensor, a catalyst component concentration sensor, a polymerization reactor flow rate sensor, a polymerization reactor composition sensor, a polymerization reactor temperature sensor, an alkyl concentration sensor, an alkyl flow rate sensor, a polymer production rate sensor, a polymer solids concentration sensor, or any combination thereof.

Embodiment 25

The method or system defined in any preceding embodiment, wherein the automation controller is configured to control the steam injection system such that an excess water ratio of less than approximately 100% based on stoichiometry of a catalyst, of an alkyl, or both, is maintained.

Embodiment 26

The method or system defined in any preceding embodiment, wherein the slurry handling system comprises a mixture conduit configured to convey the mixture to the diluent and monomer recovery system.

Embodiment 27

The method or system defined in any preceding embodiment, wherein the steam injection system comprises a plurality of steam injection openings disposed along a longitudinal axis of the mixture conduit, or about a circumference of the mixture conduit, or any combination thereof.

Embodiment 28

The method or system defined in any preceding embodiment, comprising the diluent and monomer recovery system, wherein the diluent and monomer recovery system is configured to separate the diluent from the polyolefin particles.

Embodiment 29

The method or system defined in any preceding embodiment, wherein the diluent and monomer recovery system comprises at least one of an in-line flash heater, a separations vessel, or a purge column, or any combination thereof.

Embodiment 30

The method or system defined in any preceding embodiment, wherein the slurry handling system comprises at least one of an isolation valve, a continuous take-off valve, a product take-off valve, or a settling leg, or any combination thereof.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method, comprising:

polymerizing a monomer in a polymerization reactor to produce a slurry comprising polyolefin particles and a diluent;

discharging at least the polyolefin particles and the diluent of the slurry as an effluent from the polymerization reactor and into a slurry handling system;

conveying the effluent from the slurry handling system to a diluent and monomer recovery system, wherein the diluent and monomer recovery system includes a separation vessel configured to separate the effluent into the polyolefin particles and the diluent; and injecting steam into the effluent downstream of the slurry handling system and upstream of the separation vessel using a steam injection system.

2. The method of claim 1, wherein discharging at least the polyolefin particles and the diluent of the slurry as the effluent from the polymerization reactor and into the slurry handling system comprises receiving the effluent into a continuous take-off of the slurry handling system.

3. The method of claim 1, comprising indicating a flow rate of the steam based on a measurement provided by a steam flow meter of the steam injection system.

4. The method of claim 1, comprising using a controller to actuate a flow control valve of the steam injection system to adjust a flow rate of the steam, using the controller to actuate a pressure control valve of the steam injection system to adjust a pressure of the steam, or a combination thereof, based on a value of a polymerization characteristic.

5. The method of claim 4, wherein the polymerization characteristic comprises a catalyst productivity, a catalyst flow rate, a catalyst concentration, a catalyst component concentration, a polymerization reactor flow rate, a polymerization reactor composition, a polymerization reactor temperature, a first output from a polymerization reactor heat balance, a second output from a polymerization reactor mass balance, an alkyl concentration, an alkyl flow rate, a polymer production rate, a polymer solids concentration, or any combination thereof.

6. The method of claim 5, comprising using the controller to maintain the flow rate of the steam between approximately 0.001 kg/hr to 2 kg/hr when the controller determines that the catalyst productivity is between approximately 1,000 to 250,000 mass of polymer produced/mass of catalyst.

7. The method of claim 5, comprising using the controller to maintain the flow rate of the steam between approximately 0.03 kg/hr to 8 kg/hr when the controller determines that the alkyl concentration is between approximately 1 ppm to 500 ppm.

8. The method of claim 4, comprising using the controller to actuate the pressure control valve such that a pressure of the steam is greater than a pressure of the effluent and is between approximately 2 MPa to 5 MPa.

9. The method of claim 1, wherein injecting the steam using the steam injection system comprises adjusting an amount of injected steam to maintain a stoichiometric deactivation ratio of water with respect to a catalyst present in the slurry, an alkyl present in the slurry, or a combination thereof.

10. The method of claim 1, wherein injecting the steam using the steam injection system comprises adjusting an amount of injected steam to maintain an excess water ratio of less than 100% based on an amount of a catalyst present in the slurry, an amount of an alkyl present in the slurry, or both.

11. The method of claim 1, comprising heating the effluent using an in-line flash heater of the diluent and monomer recovery system upstream of the separation vessel to generate a mixture comprising the polyolefin particles and a liquid phase, a vapor phase, or a combination thereof.

12. The method of claim 11, comprising maintaining a temperature of the mixture at less than approximately 100 degrees Celsius using the in-line flash heater.

13. The method of claim 1, wherein injecting steam into the effluent downstream of the slurry handling system and upstream of the separation vessel using the steam injection system comprises injecting an amount of steam sufficient to substantially stop further polymerization.

14. A system, comprising:

a polymerization reactor configured to polymerize a monomer to produce a slurry comprising polyolefin particles and diluent;

a slurry handling system configured to receive at least the polyolefin particles and the diluent of the slurry as an effluent from the polymerization reactor and configured to provide the effluent to a diluent and monomer recovery system downstream of the slurry handling system, wherein the diluent and monomer recovery system includes an in-line flash heater configured to increase a temperature of the effluent; and one or more automation controllers configured to:

receive an input indicative of a polymerization characteristic; and activate an output to actuate a steam injection system to inject steam into the effluent at the in-line flash heater or upstream of the in-line flash heater based at least in part on the input.

15. The system of claim 14, comprising at least one sensor configured to measure a value of the polymerization characteristic to generate the input.

16. The system of claim 14, wherein the polymerization characteristic comprises a catalyst productivity, a catalyst flow rate, a catalyst concentration, a catalyst component concentration, a polymerization reactor flow rate, a polymerization reactor composition, a polymerization reactor temperature, a first output from a polymerization reactor heat balance, a second output from a polymerization reactor mass balance, an alkyl concentration, an alkyl flow rate, a polymer production rate, a polymer solids concentration, or any combination thereof.

17. The system of claim 14, wherein the steam injection system comprises a steam flow control valve configured to receive the output and adjust a flow rate of the steam in response to the output, a pressure control valve configured to receive the output and adjust a pressure of the steam in response to the output, or a combination thereof.

18. The system of claim 14, wherein the one or more automation controllers are configured to control the steam injection system to inject the steam at a stoichiometric deactivation ratio of water with respect to a catalyst present in the slurry, an alkyl present in the slurry, or a combination thereof.

19. The system of claim 14, wherein the one or more automation controllers are configured to control the steam injection system to inject the steam at an excess water ratio of less than 100% based on an amount of a catalyst present in the slurry, an amount of an alkyl present in the slurry, or both.

20. The system of claim 14, wherein the amount of steam injected into the effluent is sufficient to substantially stop further polymerization.

21. A system, comprising:

a polymerization reactor configured to produce a slurry comprising polyolefin particles and a diluent;

a slurry handling system configured to receive at least the polyolefin particles and the diluent of the slurry as an effluent from the polymerization reactor and convey the effluent to a diluent and monomer recovery system through a conduit; and a steam injection system configured to inject steam into the effluent downstream of the slurry handling system, wherein the steam injection system comprises a plurality of steam injection openings disposed along a longitudinal axis of the conduit, about a circumference of the conduit, or a combination thereof.

22. The system of claim 21, wherein the steam injection system comprises a steam flow meter configured to provide an indication of a flow rate of the steam.

23. The system of claim 22, wherein the steam flow meter comprises a mass flow meter, an inertial flow meter, a coriolis meter, a thermodynamic meter, or any combination thereof.

24. The system of claim 21, wherein the steam injection system comprises a flow control valve configured to adjust a flow rate of the steam, a pressure control valve configured to adjust a pressure of the steam, or a combination thereof.

25. The system of claim 21, comprising an automation controller configured to control the steam injection system to adjust a flow rate of the injected steam, a pressure of the injected steam, or a combination thereof, based at least on a feedback signal received by the automation controller from a sensor.

26. The system of claim 25, wherein the sensor comprises a catalyst flow rate sensor, a catalyst concentration sensor, a catalyst component concentration sensor, a polymerization reactor flow rate sensor, a polymerization reactor composition sensor, a polymerization reactor temperature sensor, an alkyl concentration sensor, an alkyl flow rate sensor, a polymer production rate sensor, a polymer solids concentration sensor, or any combination thereof.

27. The system of claim 25, wherein the automation controller is configured to control the steam injection system such that an excess water ratio of less than 100% based on an amount of a catalyst present in the slurry, an amount of an alkyl present in the slurry, or both, is maintained.

28. The system of claim 21, comprising the diluent and monomer recovery system, wherein the diluent and monomer recovery system is configured to separate the diluent from the polyolefin particles.

29. The system of claim 28, wherein the diluent and monomer recovery system comprises an in-line flash heater, a separation vessel, a purge column, or any combination thereof.

30. The system of claim 21, wherein the slurry handling system comprises an isolation valve, a continuous take-off, a product take-off valve, a settling leg, or any combination thereof.

31. The system of claim 21, wherein the steam injection system is configured to inject an amount of steam into the effluent that is sufficient to substantially stop further polymerization.

* * * * *